Figure 1:
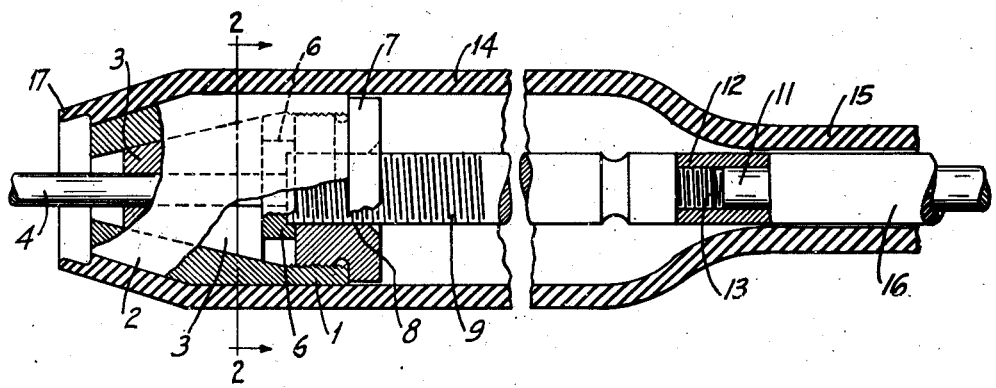

Feb. 19, 1946. H. N. LININGER 2,395,228
ELECTRODE HOLDER
Filed Aug. 8, 1944

INVENTOR
Herbert N. Lininger
BY
Charles S. Evans
HIS ATTORNEY

Patented Feb. 19, 1946

2,395,228

UNITED STATES PATENT OFFICE 2,395,228

ELECTRODE HOLDER

Herbert N. Lininger, San Francisco, Calif.

Application August 8, 1944, Serial No. 548,545

3 Claims. (Cl. 219—8)

My invention relates to a holder for electrodes, such as the consumable welding rod electrodes used in electric welding, by which an electrode may be gripped and manipulated during a welding operation.

It is among the objects of my invention to provide a holder for welding rods in which the conductive elements are effectively insulated, and which will prevent short circuiting of the holder by contact of any of its conductive elements with a grounded conductor when the holder is placed upon or moved over a surface.

Another object is to provide a holder having electrode engaging means which will facilitate the placing of an electrode in the holder, and insure an effective gripping engagement therewith.

A further object is to provide a holder construction which will facilitate attachment of the holder to a conductive cable; and in which the conductive portion of the holder is substantially fully enclosed within an insulating handle operable for actuating the electrode clutching means and for manipulating the electrode.

My invention possesses other objects and features of value, some of which with the foregoing will be set forth in the following description of the invention. It is to be understood that I do not limit myself to the showing made by the said description and the drawing as I may adopt variant forms of the invention within the scope of the appended claims.

Figure 2:
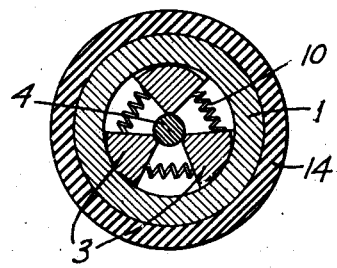

In the drawing:

Figure 1 is a view, partly in elevation and partly in longitudinal vertical mid-section, of an electrode holder embodying my invention; and Figure 2 is a transverse section taken upon the line 2—2 of Figure 1, in the direction indicated.

In terms of broad inclusion, the electrode holder of my invention comprises a chuck having jaws for clutching a welding rod and a stem for actuating the jaws. The stem extends axially from the chuck and is connected to the conductive portion of a conductor cable by a sleeve or other suitable connecting means, with the stem and chuck providing electrical connection between the cable and the rod. A tubular handle of insulating material covers the chuck and stem and the connection thereof to the cable; and provides means for actuating the chuck to engage and disengage a welding rod, the handle preferably being secured to the chuck and being rotatable relative to the stem and cable.

In terms of greater detail, the holder of my invention comprises a chuck designated in general by the numeral 1 and comprising a hollow body portion having a tapered portion 2 at one end. A plurality of jaws 3 are mounted for movement within the body 1 to engage and disengage the shank of a welding rod 4 inserted axially into the chuck. A block 6 slidable within the body 1 bears against the inner ends of the jaws 3. A plate 7 is threaded into the inner end of the body, and is provided with a threaded opening 8 at its center to receive a stem 9 arranged to be advanced or receded through the plate 7 for actuating the jaws 3 through the medium of the block 6. As the stem 9 is advanced into the body of the chuck 1 (or, conversely, the chuck 1 is advanced onto the stem 9) the block 6 forces the jaws into the tapered end 2 of the body, and the inclination of the inner walls causes the jaws to be forced radially inwardly into clutching engagement with the rod 4. Relative movement of the stem 9 and chuck 1 in the opposite direction releases the pressure and permits the jaws to spread, and release the rod. Preferably suitable springs 10 are provided to cause the jaws to recede along with the block 6 and stem 9.

The stem 9 is connected to an end of an insulated flexible conductor cable 11 in a manner such that the stem 9 and the several parts of the chuck 1 provide an electrical connection between the cable 11 and the rod 4. For example, a sleeve 12 may be soldered or otherwise secured to the end of the conductive portion of the cable 11; and a threaded extension 13 upon the stem 9, may be screwed into the sleeve 12 for attaching the stem to the cable.

A tubular sleeve-like handle is applied to cover the chuck and the conductive members forming the electrical connection from the cable 11 to the rod 4. Preferably the handle is formed of insulating material, such as rubber, plastic, or other suitable material; and comprises a body portion 14 extending from the outer tip of the chuck 1 past the inner end of the stem 9. A reduced extension 15 extends beyond the sleeve 12 and overlaps a substantial portion of the insulation 16 at the end of the cable 11. The handle is preferably secured to the chuck 1, as for example by molding the handle thereon; and is rotatable relative to the stem 9 and cable 11. The extension fits over the cable sufficiently closely to permit the cable to serve as a bearing for the inner end of the handle. Preferably a flange 17 is provided at the outer end to overhang the tip of the chuck 1.

The handle covers and effectively insulates all of the conductive parts connecting the cable 11 to the rod 4. At the same time the handle serves for operating the chuck 1 to engage and disengage a rod 4, and to provide a safe and convenient handle for manipulating the rod 4 during a welding operation. The handle effectively guards the operator against contact with the conductive elements; and permits the holder to be dragged from place to place without danger of causing short circuits or undesired arcing by contact with grounded conductors which may be encountered.

If, as I prefer, the handle is made of vulcanized rubber, or other insulating material of a resilient character, the holder may be subjected to the severe abuse often encountered in the hands of careless workmen, without damage to the chuck and electrical connections; and with little risk of injury to the workman, or damage to property encountered.

I claim:

1. A welding rod holder comprising a chuck provided with jaws movable to clutch a welding rod, a jaw actuating stem extending axially rearwardly from the chuck, means for securing the stem to a conductor cable, with the stem and chuck providing an electrically conductive connection between the cable and the rod, and an insulating sleeve secured to the chuck and extending rearwardly over the stem and the adjacent end of the cable in rotatable relation thereto.

2. A welding rod holder comprising a chuck provided with jaws movable to clutch a welding rod, a jaw actuating stem extending axially rearwardly from the chuck, means for securing the stem to a conductor cable, with the stem and chuck providing an electrically conductive connection between the cable and the rod, an insulating sleeve secured to the chuck and extending rearwardly over the stem and the adjacent end of the cable in rotatable relation thereto, and a flange upon the sleeve overhanging the forward end of the chuck.

3. A welding rod holder comprising a chuck provided with jaws movable to clutch a welding rod, a jaw actuating stem extending axially rearwardly from the chuck, means for securing the stem to a conductor cable, with the stem and chuck providing an electrically conductive connection between the cable and the rod, an insulating sleeve having a body portion secured to the chuck and enclosing the stem, and a reduced extension extending over the adjacent end of the cable in rotatable relation thereto, said sleeve providing a handle for operating the chuck and manipulating the rod.

HERBERT N. LININGER.